Feb. 11, 1964   W. W. DRUMMOND   3,120,689
FIBER WINDING AND FABRICATING METHOD AND MACHINE
Filed Aug. 20, 1959   3 Sheets-Sheet 1

INVENTOR
WARREN WENDELL DRUMMOND

BY

ATTORNEY

Feb. 11, 1964  W. W. DRUMMOND  3,120,689
FIBER WINDING AND FABRICATING METHOD AND MACHINE
Filed Aug. 20, 1959  3 Sheets-Sheet 2

INVENTOR
WARREN WENDELL DRUMMOND

BY

ATTORNEY

Feb. 11, 1964   W. W. DRUMMOND   3,120,689
FIBER WINDING AND FABRICATING METHOD AND MACHINE
Filed Aug. 20, 1959   3 Sheets-Sheet 3

INVENTOR
WARREN WENDELL DRUMMOND
BY
ATTORNEY

United States Patent Office 3,120,689
Patented Feb. 11, 1964

3,120,689
FIBER WINDING AND FABRICATING METHOD AND MACHINE
Warren Wendell Drummond, Madison, Wis., assignor to Bjorksten Research Laboratories, Inc., Fitchburg, Wis., a corporation of Illinois
Filed Aug. 20, 1959, Ser. No. 834,973
7 Claims. (Cl. 28—1)

This invention relates to a method and a machine for placing a continuous length of fiber into a compact arrangement from which fiber may be rapidly unlaid and recovered, and more particularly relates to a method and a machine for placing a fiber of continuous length into a pattern of overlapping whorled convolutions of a configuration similar to that which would be obtained by slidably removing from the arbor of a reel a one layer thickness of fiber and permitting each removed winding to fall sidewise unto the next so as to collapse the structure and convert the standing right angular form of the fiber helix into an acute angular form.

Conventional methods of winding and storing textile fiber are unsatisfactory in several respects. No method has heretofore been discovered for winding fiber continuously at substantially constant high rates of speed. Fibers of ceramic, glass or synthetic resinous compositions are preferably to be packaged in uniformly stressed or unstressed condition to enable dyes that may later be applied to the fibers to uniformly color the fiber. The affinity of many dyes for fibers glasseous and synthetic resinous substances is materially affected by the tension to which the fibers have been subjected during operations preceding the dying process.

In spool winding operations in which a driven arbor is used to rotate the spool upon which a fiber is being wound, a constant speed of rotation of the arbor results in the fiber being wound at increasingly great linear speeds as the diameter of the spool increases, and causes the tensile stress on the fiber to increase in corrseponding manner. In addition, the pressure on the fiber near the core of the spool is increased as outer layers of fiber are wound onto the spool and sizing on the fiber may be squeezed between the windings on the spool and be rendered useless. In addition, instantaneous fluctuations in the linear speed of fiber travel may occur if the fiber is fed through a reciprocating guide piece.

A fiber which is traversed at high speeds across the length of an arbor is often damaged by the rapid change of motion of the traversing guide and may be stressed to failure.

Another shortcoming of conventional fiber winding operations is that a winding operation must be interrupted to change the spools on which fiber is being wound. It is desirable that the winding of fiber can be accomplished with a machine which can be run continuously and in which spools can be changed without interrupting the manufacturing process.

Conventional fiber packages which have large core openings are undesirable because the core volume is not utilized and the bulk of the package is unnecessarily great.

The method and the machine of this invention provide a means of placing a continuous length of fiber in an unstressed condition in a compact arrangement from which the fiber may be withdrawn without tangling or snarling. Because the fiber is unstressed it may later be dyed without exhibiting variable affinity for the dye composition. Fibers which are arranged in the inventive manner may be placed on a moving conveyor or may be wound into packages continuously and without interruption while process or packaging changes are made.

It is an object of this invention to provide a method and a machine for continuously removing fiber from a spinning operation and placing it in a compact arrangement for storage or for processing.

It is another object of this invention to provide a method and a machine for packing fibers in a manner which subjects the fibers to uniform stresses along their entire length.

It is another object of the invention to provide a fiber pack in which sizing is not stripped from base layers of fiber by overlayers of fiber which are tightly wound thereon.

It is another object of this invention to provide a fiber pack which can be unwound free of snarling and without breaking at a high rate of speed.

It is another object of this invention to provide a method and a machine for manufacturing ribbons and mats of resin bonded fiber.

Other objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

Figure 1:
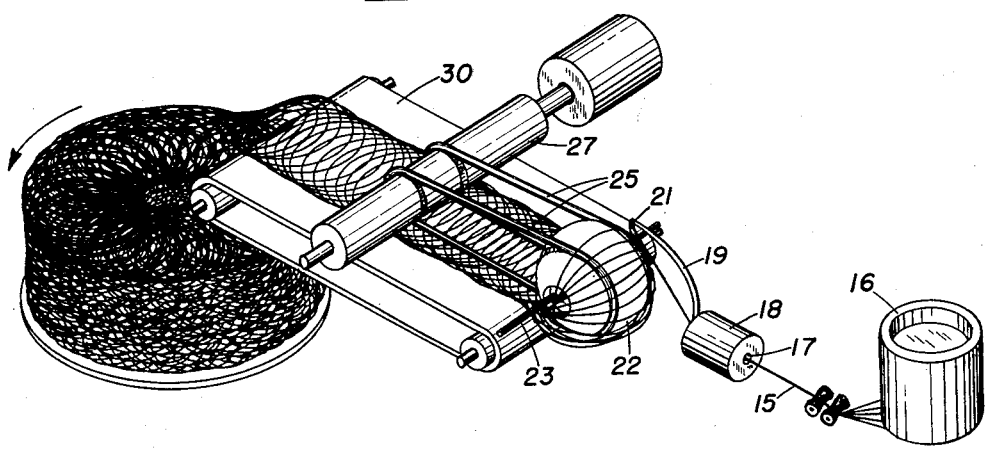
FIGURE 1 is a perspective view of the machine of this invention.
Figure 2:
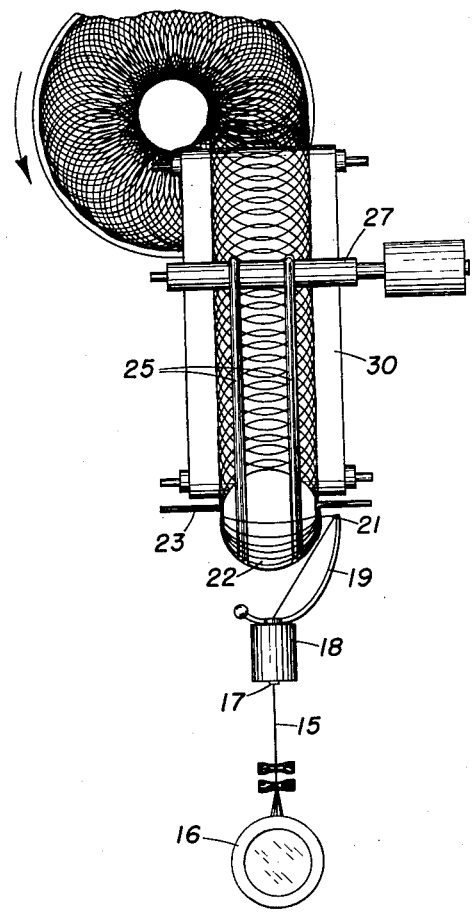
FIGURE 2 is a plan view of the machine of FIGURE 1.

Referring now to FIGURES 1 and 2 there is shown fiber 15 being drawn from bushing 16 containing molten material such as glass or resin into hollow shaft 17 of electric motor 18. Fiber 15 is passed from hollow shaft 17 through eyelet 21 of flyer 19. It is preferable that fiber 15 be deviated in its path of travel in passing through shaft 17 and eyelet 21 as little as possible to minimize stresses in fiber 15. Rotating flyer 19 may be fixedly attached to hollow shaft 17 and the components may be mounted by conventional electric motor bearing means in motor 18.

Figure 11:
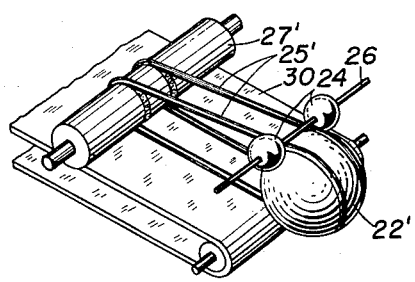
FIGURE 11 is a perspective view of another embodiment of the machine of FIGURES 1 and 2.
Figure 12:
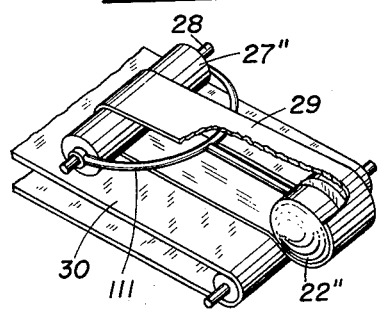
FIGURE 12 is a perspective view of another embodiment of the machine of FIGURES 1 and 2.

When motor 18 is operated hollow shaft 17 and flyer 19 affixed thereto are caused to rotate. Eyelet 21 may be caused to revolve about sheaved member 22 and thereby be laid in great circles, defined as circumferences of sheaved member 22 that lay in equatorial planes thereof, by rotation of flyer 19. Simultaneously with the laying of fiber 15, sheaved member 22 may be rotatively driven about shaft 23 by bands 25. Shaft 23 may have an eccentric throw to enable fibers 15 to be wound in great circles on sheaved member 22. Alternatively, shaft 23 may be eliminated as shown in FIGURE 11 wherein shaft 26 and spherical bearing means 24 are shown disposed to exert radial pressure against member 22', thereby tensioning bands 25 against member 22' and belt 30, or may be journaled as an internal shaft 111 shown configured with an integral yoke wherefor member 22'' may be split substantially as shown in FIGURE 12 with the yoke being carried by axle 28 of roll 27'. Sheaved member 22' may be grooved as shown to accommodate bands 25 in a manner such that bands 25 are substantially flush with the surface of sheaved member 22'. In FIGURE 12 a non-spherical, ungrooved and substantially cylindrical member 22'' is illustrated with belt 29 runnnig thereon and on roll 27'. In FIGURES 1–4 and 11 it will be understood that the shaft ends shown unsupported for convenience are carried by stationary bearing supported by the frame of the device shown.

In operation, rotating flyer 19 may continuously cause fiber 15 to be laid in a substantially equatorial plane on sheaved member 22, and simultaneously sheaved member 22 may be caused to rotate about axis 23 so that the equatorial plane in which fiber 15 is laid is constantly being changed. Thus, fiber 15 may be laid adjacent to the position that the fiber was laid in preceding revolutions of flyer 19.

Friction bands 25 may have a path of departure from sheaved member 22 removed from the position where fiber 15 is laid on sheaved member 22 of only a few degrees or of several degrees. The exact position of the tangential plane along which bands 25 may depart is not critical so long as the plane is removed from the fiber laying position sufficiently to enable fiber 15 to be operably laid on sheaved member 22 by rotation of flyer 19. Bands 25 may be caused to come into frictional contact with belt 30 after departing from rotating sheaved member 22 and to restrain whorled convolutions of fiber 15 operably therebetween.

Substantially at the point where bands 25 depart contact with sheaved member 22 wrappings of fiber 15 are caused to be peeled from sheaved member 22 by bands 25 to form whorled overlapping convolutions of unstressed fiber. Depending upon the configuration and juxtaposition of sheaved member 22, bands 25 and belt 30, the wrappings of fiber 15 on sheaved member 22 will be in greater or lesser amount restrained in the nip of sheaved member 22 and belt 30 when they are peeled from sheaved member 22. After being peeled the windings are free of tensile stresses and are enabled to assume the configuration which most fully relieves stresses in the fiber. Whorled convolutions of fiber 15 then may be conveyed between belt 30 and bands 25 to a position beyond roll 27 and lay loosely on conveyor 30 in unstressed condition and may be deposited upon a rotating platform to form a package.

Figure 3:
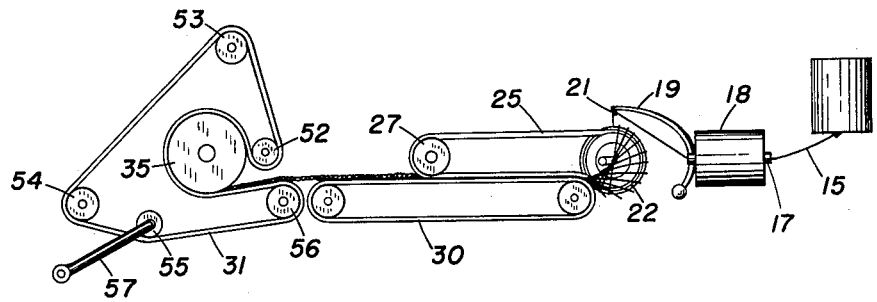
FIGURE 3 is a schematic elevation of a fiber packaging embodiment which may be used in combination with the machine of FIGURES 1 and 2.

In FIGURE 3 is schematically shown an additional embodiment of the machine of FIGURES 1 and 2 which may be used for reeling fiber 15 into packages. Belt 31 is shown independent of belt 30, but could be made as an extension of belt 30. Belts 30 and 31 are preferably powered by operable connection such as by belts or gears to driven roll 27. Belt 31 substantially encircles spool 35 and passes in sequence after leaving spool 35 over idler pulleys 52, 53, 54, 55 and drive pulley 56. Idler pulley 55 may be rotatably supported by tensioning member 57 thereby to provide a variable position pulley to take up slack in belt 31. As the diameter of spool 35 increases as fiber is wound onto spool 35 the slack in belt 31 diminishes and tension in belt 31 is enabled to remain constant by the action of pulley 55. Spool 35 may be operably removed from the machine by rotating idler pulley 52 out of position to enable belt 31 to be removed from contact with roll 35.

Figure 4:
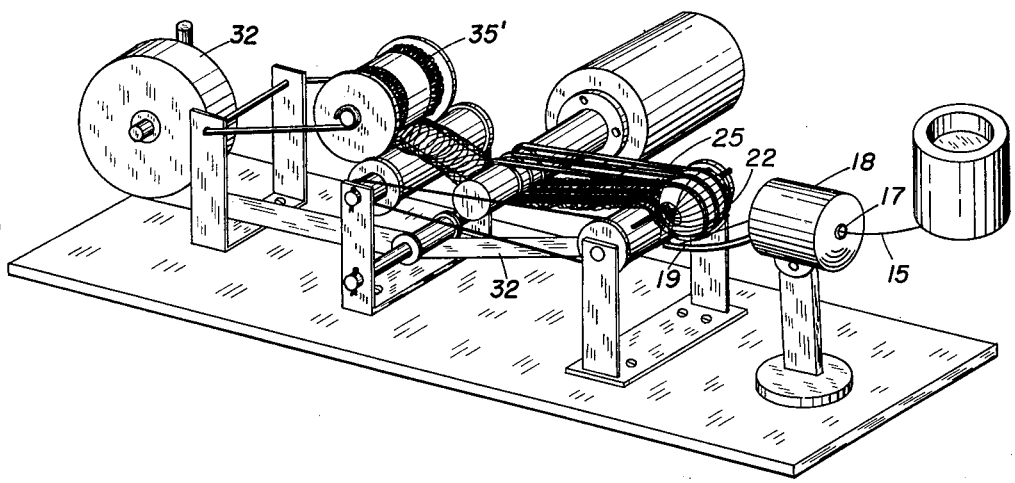
FIGURE 4 is a perspective of another embodiment of the machine of this invention.

In FIGURE 4 is shown a modification of the machine of FIGURE 3 wherein paper tape 32 is disposed beneath fiber 15 after fiber 15 has been drawn from bushing 16 and wound on sheaved member 22 and bands 25'. Tape 32 operably supports fiber 15 while fiber 15 is being wound on reel 35' and obviates the necessity of encircling reel 35' with belt 31. Tape 32 may be either uncoated or coated with pressure sensitive adhesive as may be desired and as handling of fiber 15 may require.

Fiber 15 may be operably withdrawn from the package formed on spool 35 either by pulling on the inner fiber end and unwinding the innermost layer of spool 35 or by the pulling on the outer fiber end to unwind the outermost spool layer. It is advantageous to unwind spool 35 by means of the inner fiber end to enable a protective wrapper to be placed about the package to prevent tangling of the outermost layers of fiber 15 thereon. However, fiber 15 unwinds without tangling or breaking whether pulled from within or without the package. When reel 35' of FIGURE 4 is similarly unwound paper tape 32 drops away as successive layers are uncovered and does not interfere with unwinding operations.

Figure 5:
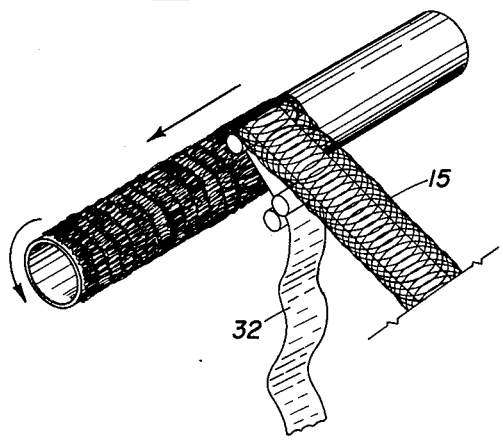
FIGURE 5 is a perspective view of an embodiment which may be used with the machine of FIGURE 4 to manufacture fiber reinforced synthetic resin pipe.

In FIGURE 5 is shown thin wall tubing coated with adhesive resin being made into reinforced pipe. Fiber 15 is adhered to the rotating tube and forms a reinforcing network in the adhesive resin to form a rigid pipe. Paper tape 32 if adhesively coated may be wrapped on the tubing or may be disposed of as shown. The resin may be either pressure sensitive and nondrying or may be hard setting or polymerizable.

Figure 6:
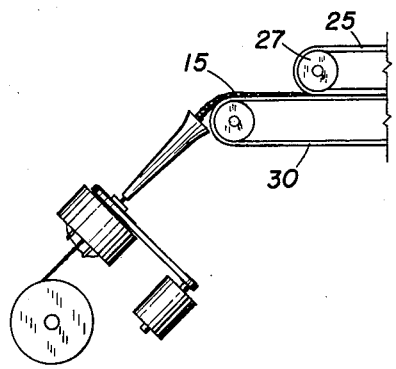
FIGURE 6 is a schematic elevation of an embodiment which may be used in combination with the machine of this invention to manufacture roving.

In FIGURE 6 whorled convolutions of fiber 15 may be drawn out linearly by being passed into a tube after being deposited on a conveyor belt to provide spiral lineations of fiber from the spiral convolutions. A filament may be helically wound about the lineations to provide untwisted roving. If desired the convolutions of fiber on belt 30 may be diametrically cut to provide an untwisted parallel end in the roving. The roving may be reeled and later used in conventional applications or may be operably unlaid by means of an air blast on the material and fiber may again be obtained or chaff may be produced.

Figure 7:
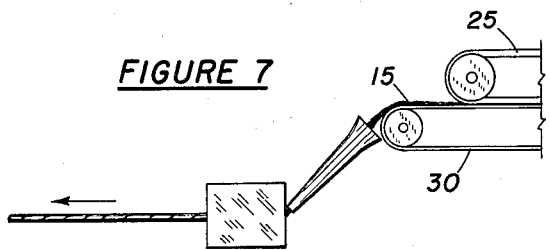
FIGURE 7 is a schematic elevation of an embodiment which may be used with the machine of this invention to manufacture cordage.

FIGURE 7 illustrates a machine for making cordage of whorled convolutions of fiber 15 and is similar to machine of FIGURE 6, but is modified so that a helical wrapping of paper or other casing material may be wrapped about fibers 15 after they are drawn into roving. If desired, the wrapping may be formed as a tube above the fiber core and be fastened together in any operable manner.

Figure 8:
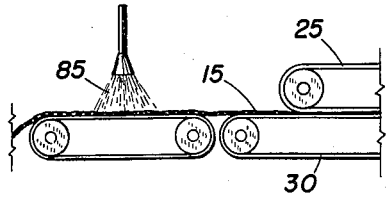
FIGURE 8 is a schematic elevation of an embodiment which may be used with the machine of this invention to manufacture resin bonded fiber.

In FIGURE 8 is shown a resin spray embodiment 85 for adhering convolutions of fiber 15 into a reinforced resin sheet. The conveyor belt material may be a substance to which the sprayed resin is non-adherent such as one having a lubricious, moist or powdered surface.

Figure 9:
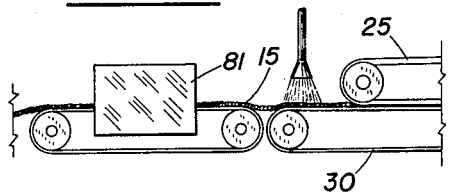
FIGURE 9 is a schematic elevation of an embodiment which may be used with the machine of this invention to manufacture ribbons of resin bonded fibers.

In FIGURE 9 is shown another embodiment of the invention wherein resin sprayed whorled convolutions of fiber 15 are passed through oven 81 before being wound onto reel means. Oven 81 may be elevated to a temperature sufficient to fuse or polymerize the resin and bond fibers 15 one to the other to form a ribbon which is possessed of uniform strength in all directions in the plane of the ribbon.

Figure 10:
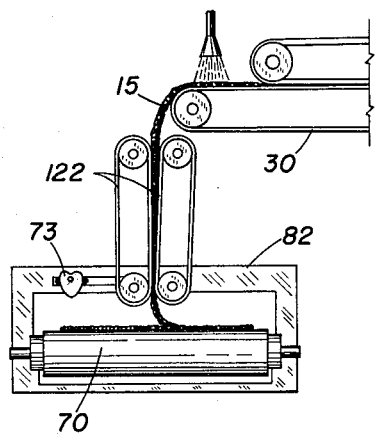
FIGURE 10 is a schematic elevation of an embodiment which may be used in combination with the machine of this invention to manufacture resin bonded fiber matting.

To obtain a mat 124'' having physical properties similar to the ribbon produced by the machine of FIGURE 9, whorled convolutions of fiber 15 may be introduced between the facings of conveyor belts 122 running at identical speeds as shown in FIGURE 10 and be laid upon an endless conveyor belt before being fed into oven 82 and bonded into a mat. The lower end of the facing belts may be reciprocated in a direction transverse to conveyor belt 70 to enable whorled convolutions of fiber 15 to be laid on belt 70 in any width that may be desired. A constant speed cam-lobe 73 is shown for providing reciprocating motion to the facing belts. The product that may be obtained from the machine of FIGURE 10 is that of a fiber mat of any dimension and thickness and is characterized by being uniformly strong in any direction in the plane of the mat.

While certain modifications and embodiments of the invention have been described, it is of course to be understood that there are a great number of variations which will suggest themselves to anyone familiar with the subject matter thereof and it is to be distinctly understood that this invention should not be limited except by such limitations as are clearly imposed in the appended claims.

I claim:

1. The method of manufacturing a ribbon patterned as a succession of overlapping whorled convolutions of fiber comprising the steps of continuously passing at least one fiber through a succession of path portions comprising longitudinal movement of the fiber through first and second path portions, said second portion defining substantially a closed geometric figure in a plane, said plane being substantially perpendicular to said first path portion then passing said fiber from said second path portion substantially transversely through a third path portion wherein said third path portion substantially comprises a partial solid geometric surface developed by rotating said plane about an axis lying substantially within said plane in coplanar and non-parallel disposition to said first path portion, then passing said closed configuration of fiber substantially tangentially therefrom along a fourth path portion to provide a ribbon of overlapping whorled fiber convolutions.

2. The process of making a continuous elongated non-adhered glass fiber ribbon comprising the steps drawing a fiber along a first path, winding said fiber in a plane substantially perpendicular to said path, continuously rotating the winding about an axis lying substantially within siad plane in coplanar and non-parallel disposition to said first path, removing said fiber as a ribbon comprising overlapping whorled convolutions substantially tangentially from the solid geometric surface developed by rotating said winding to provide said elongated ribbon.

3. The method of claim 1 further characterized by said fiber convolutions being adhered together by adhesive means.

4. The method of claim 1 further characterized by said ribbon being restricted in width to render said convolutions substantially lineal.

5. The method of claim 1 further characterized by said ribbon being restricted in width to render said convolutions substantially lineal, said ribbon lineations being wrapped to form a bundle.

6. A machine for fabricating a ribbon consisting of series of partially overlapping regularly spaced substantially circular loops comprising a grooved revolving sphere, said grooves being filled with revolving belts, a flyer revolving around said sphere substantially in its equatorial plane, said flyer depositing a continuous filament in sequential substantially circular loops around said sphere, said belt means removing said loops continuously.

7. A machine for manufacturing non-adhering convolutions of fiber in ribbon form comprising a rotating means having a non-axial fiber guide means affixed thereto, said guide means being revolvable in a plane, said plane being substantially coplanar with an equatorial plane of a rotatable reel sheave, said reel sheave having at least one flexible band means running about a shaft apart from said sheaved reel, said machine operating by having a fiber passed through said guide means and wound on said reel sheave and band means, said wound fiber being removable from said reel sheave by said band means departing contact with said reel sheave, said wound fiber dropping as ribbon having overlapping substantially planar convolutions.

References Cited in the file of this patent
UNITED STATES PATENTS

| | | |
|---|---|---|
| 2,120,910 | Shephard | June 14, 1938 |
| 2,369,395 | Heymann | Feb. 13, 1945 |
| 2,604,687 | Broden | July 29, 1952 |
| 2,714,797 | Drummond et al. | Aug. 9, 1955 |
| 2,746,118 | Drummond et al. | May 22, 1956 |
| 2,862,524 | Smith | Dec. 2, 1958 |
| 2,882,673 | Buddecke | Apr. 21, 1959 |
| 2,936,508 | Buddecke | May 17, 1960 |